United States Patent [19]
Brümmer

[11] Patent Number: 5,753,059
[45] Date of Patent: May 19, 1998

[54] TORSIONALLY RIGID COVER AND METHOD

[75] Inventor: Michael Brümmer, Laudenbach, Germany

[73] Assignee: Firma Carl Freudenberg, Weinheom, Germany

[21] Appl. No.: 238,413

[22] Filed: May 5, 1994

[30] Foreign Application Priority Data

Mar. 7, 1993 [DE] Germany .................. 43 15 149.3

[51] Int. Cl.$^6$ .................................................. B32B 31/16
[52] U.S. Cl. .................. 156/73.1; 156/242; 264/445
[58] Field of Search .......................... 156/73.1, 242, 156/308.4, 309.6; 264/442, 443, 445

[56] References Cited

U.S. PATENT DOCUMENTS

| | | | |
|---|---|---|---|
| 4,525,401 | 6/1985 | Pocock et al. | 428/64 |
| 4,577,775 | 3/1986 | Kresin | 220/66 |
| 4,647,325 | 3/1987 | Bach | 156/73.1 |
| 5,032,213 | 7/1991 | Thomas, Jr. | 156/498 |

Primary Examiner—James Sells
Attorney, Agent, or Firm—Kenyon & Kenyon

[57] ABSTRACT

A cover of polymeric material developed substantially in cup shape is disclosed. The bottom of the cover has stiffening ribs on its inner side. The stiffening ribs are developed as a cross bracing, the cross bracing being interrupted at least in part by gaps, the stiffening ribs being connected to each other by a secondary connecting element spanning the gaps.

6 Claims, 4 Drawing Sheets

TORSIONALLY RIGID COVER AND METHOD

BACKGROUND OF THE INVENTION

The present invention relates generally to a cover constructed of polymeric material that is substantially cup shaped and which has a bottom having stiffening ribs on its interior.

Such covers are generally known and used, for instance, to cover belt pulleys or as the valve covers of an internal combustion engine. The stiffening ribs are provided in order to minimize warping of the cover caused by manufacture. The warping is caused by varying shrinkage of material in different regions of the cover so that torsion is produced along the longitudinal axis of the cover. Stiffening ribs which are integrally developed have the disadvantage that relatively high forces are required while fastening the cover in order to overcome the slight warping which remains, and to align the sealing surface approximately parallel to the mating surface. Particularly when soft seals of elastomeric material are used, such as are employed, for instance, for the acoustic decoupling of the cover, the danger exists that the cover will be mechanically overstressed and/or damaged upon its mounting.

There remains a need to provide a cover of polymer material (and a method for its manufacture) that is dimensionally stable and torsionally rigid and that has a fastening flange with a flat sealing surface.

SUMMARY OF INVENTION

The instant invention provides for a method for producing a novel cup-shaped polymeric cover having stiffening ribs.

The stiffening ribs are provided in the form of a cross bracing composed of stiffening rib elements separated from one another by clearances or gaps. These clearances are bridged by secondary connecting elements that link the ribs to each other. As a result of the clearances within the cross bracing, the polymeric cover is initially relatively deformable in torsion. A torsionally rigid cover of stable shape is subsequently obtained once the clearances are bridged by a series of secondary connecting elements, which occurs only after the cover has been straightened into the desired shape so that the fastening flange has a flat sealing surface. In this way, mechanical uniform stressing of the seal used is obtained along its entire circumference upon the mounting of the cover.

In accordance with a first embodiment, the stiffening ribs which are adjacent to the secondary connecting element can be connected together by adhesion. In this case, the secondary connecting element can, for instance, be an adhesive substance. The use of adhesive is advantageous in that it increases the weight of the cover only insignificantly. Polyamide with fiberglass filling is one suitable such adhesive substance for the cover. The connection of the end or tip surfaces of the stiffening ribs by an adhesive substance is also advantageous from a manufacturing standpoint and is favorable in cost from an economic standpoint.

The stiffening ribs, which are contiguous to each other through the clearances, can be provided with a profiling in the region of their boundary portions that have congruently shaped surfaces. Such surface profiling helps provide a relatively large surface are on each boundary portion which increases the surface area available for the application of adhesive. Hence, adhesive connections can be improved even upon the action of mechanical and/or thermal stresses.

The profiled boundaries may be developed, for instance, in semi-circular, trough- or L-shape.

In accordance with another embodiment, the secondary connecting element can be formed as a weld seam. In this case, it is advantageous to use the same polymer material that the cover is made from as filler material for the welding as well. After the adjacent reinforcing ribs have been welded together, they pass into one another as an integral, single piece of the identical material. The torsional rigidity of the cover then is as great as that of a cross-wise stiffening bracing that has been formed via conventional manufacture. However, in contrast with the latter, the present invention provides a uniformly flat sealing surface along the fastening flange. Subsequent straightening of the cover during mounting, as is necessary in the prior art, can therefore be avoided. This is particularly advantageous when the inside of the cover is acted on by heat and/or liquid media. Due to the fact that the entire cover consists of a single material, simple adaptation to the specific circumstances of the particular use is possible. For example, if the cover is used as an acoustically decoupled valve cover on the cylinder head of an internal combustion engine, it can be constructed of polyamide, which is resistant to hot oil mist.

In accordance with another embodiment, the secondary connecting element can be formed as a distinct connector body formed of the same material as the stiffening ribs and which connects the boundaries of the stiffening ribs together so that they pass into one another and form a single piece. The connector body can be produced, for instance, in a further injection-molding process. The body of material can be made as a separate individual part. In that case, it is advantageous for the connector body to have a stiffness which differs from that of the stiffening ribs so that the stiffness of the cover can thereby be controlled in the desired manner.

In accordance with another embodiment, the secondary connecting element can take the form of rivets, screws or clamps.

In order to manufacture the cover of polymer material described above, a cover having interrupted cross bracing is produced in a first manufacturing step by injection molding. After removal from the mold, the cover is clamped with its sealing surface on a flange surface corresponding to the structural part of be covered, and the stiffening ribs of the cross bracing which are separated from one another by gaps or clearances are then connected to each other in a second manufacturing step. The entire plastic cover advantageously does not exhibit any of the warping caused in the manufacture of other types of such covers, so that the sealing surfaces they provide are absolutely flat. Such a warp-free cover can be aligned particularly easily parallel to the mating surface of the machine part to be covered. If, for instance, a seal is inserted in order to seal off the joint between the cover and the machine part, it is acted on by uniform pressure along its entire periphery by the flat parallel surfaces of the two parts which are to be fixed to each other. Leaks in partial regions of the circumferential extent of the seal can thereby be dependably avoided, and a particularly good acoustic decoupling of the two parts is attained.

As noted, after the first manufacturing step, the cover is relatively torsionally weak due to the clearances or gaps in the crosswise stiffening ribs, and is clamped on a sealing plane corresponding to the plane of the structural part to be sealed. When the cover has been straightened, the boundaries of the stiffening ribs which are adjacent to each other are connected together.

The stiffening ribs can be connected to each other by adhesion in the second manufacturing step. An adhesive connection can be produced in the manner that the stiffening ribs are connected together by an adhesive substance. Furthermore, a welding of the contiguous boundaries of the stiffening ribs can be effected thermally or by ultrasonics.

In accordance with another method, the stiffening ribs can be connected to each other in the second manufacturing step by an injection-molding process. A cover which is entirely of the same material can thereby be produced.

The cover, ready for use, has a torsional rigidity which corresponds to that of a crosswise bracing which is closed on itself, in which connection warping of the cover, in particular due to difference in shrinkage upon the manufacture by the injection-molding process and stresses caused thereby, is dependably avoided.

BRIEF DESCRIPTIONS OF THE FIGURES

DETAILED DESCRIPTION

Figure 1:
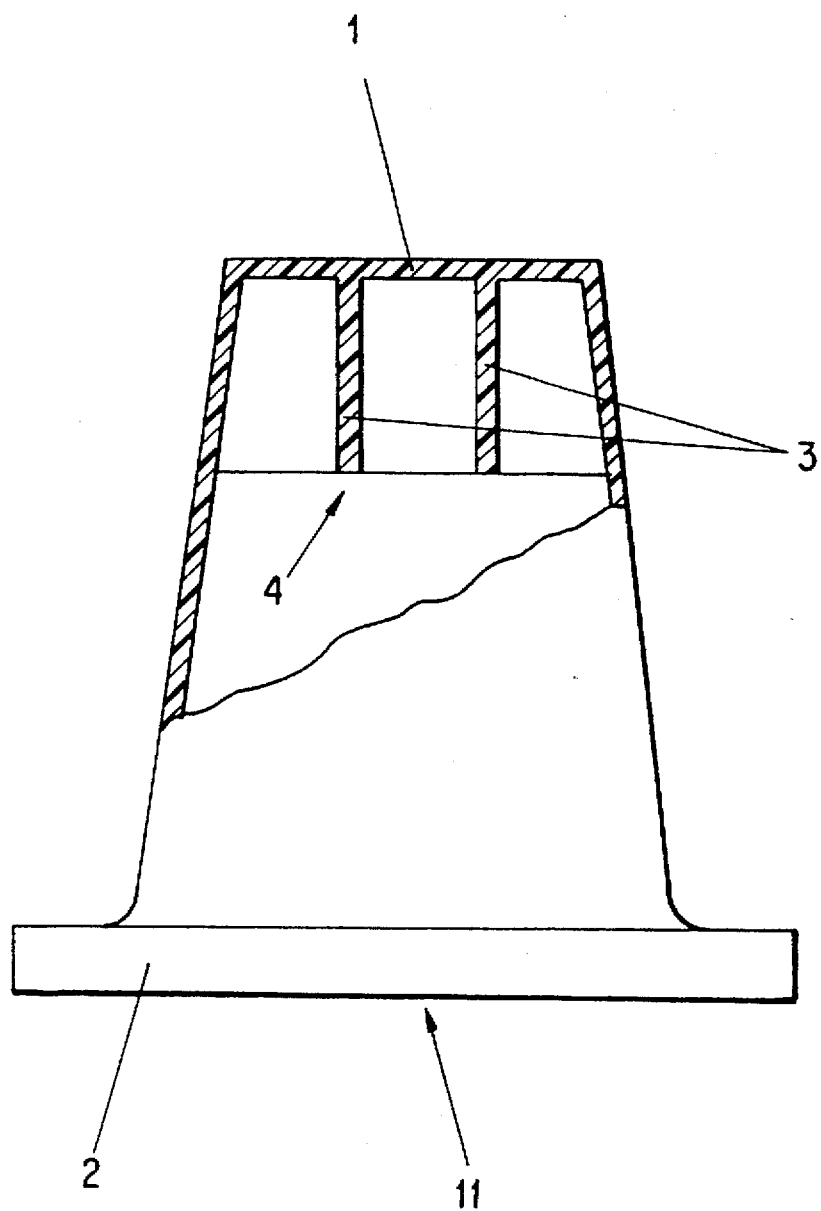
FIG. 1 is a view of a first embodiment of a polymeric cover, shown partially in section.

FIG. 1 illustrates a first embodiment of a cover made of polymeric material constructed according to the principles of the invention that has been developed for use as a valve cover for an internal combustion engine. The bottom 1 of the cover has stiffening ribs 3 which are arranged in a cross bracing 4. On the side facing away from the bottom 1 of the cover there is arranged a fastening flange 2 which extends circumferentially around the cup portion and which is provided with openings which are penetrated through by screws or bolts when the cover is mounted.

Figure 2:
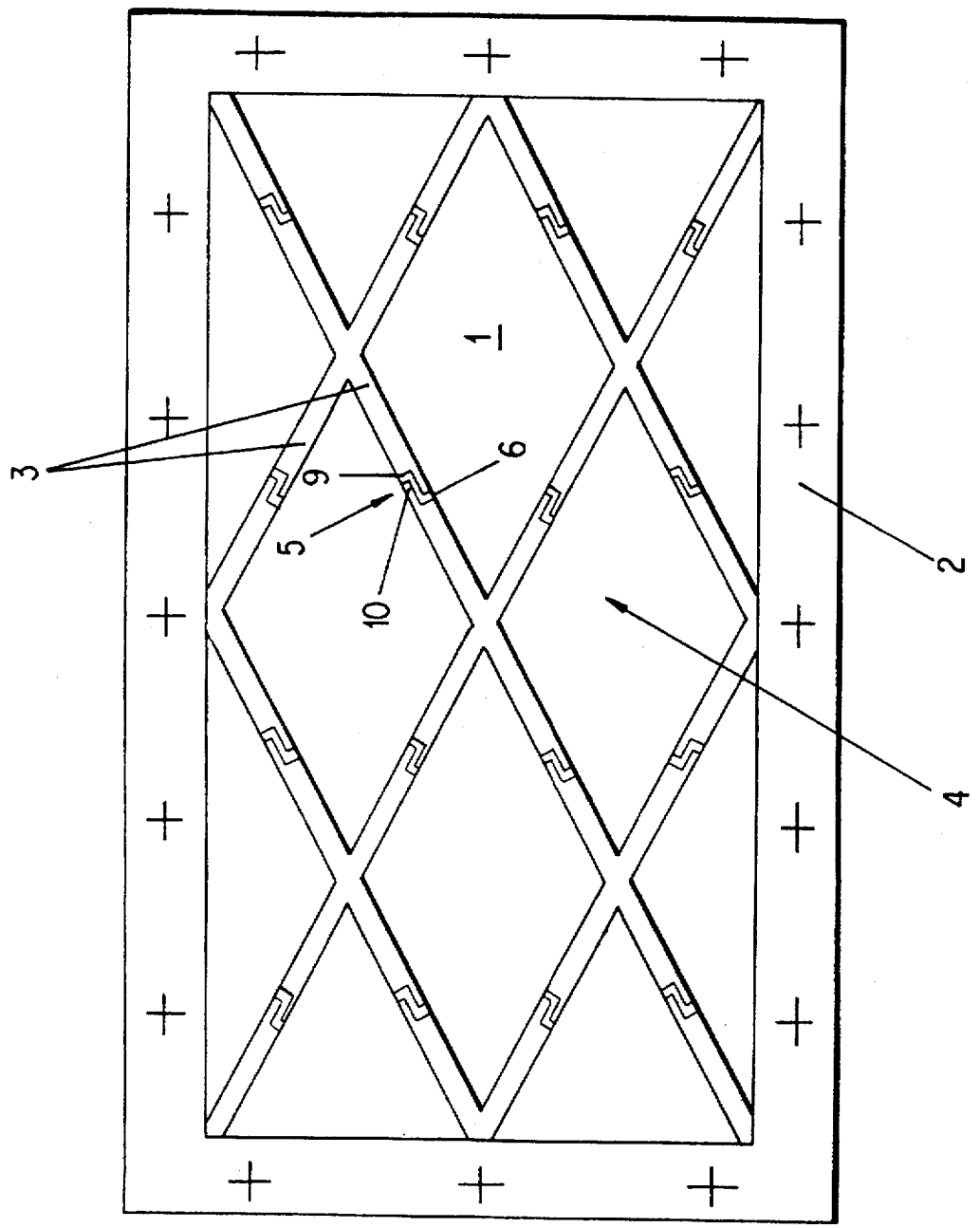
FIG. 2 is a view of the interior of the cover of FIG. 1, in which the stiffening ribs of the bottom of the cover are seen to form a cross bracing.

FIG. 2 is a view of the interior of the cup-shaped cover as seen from the fastening flange 2, in which the stiffening ribs 3 which pass into and form a single piece with the cover bottom 1 are arranged to form a cross bracing 4. In this embodiment, the contiguous boundaries 9, 10 of the stiffening ribs 3 are connected to each other adhesively by an adhesive substance 6. The boundaries 9, 10 have an L-shape, whereby the surface of the stiffening ribs is relatively enlarged in this region. The relatively enlarged surface results in a stable connection of the stiffening ribs with each other.

Figure 3:
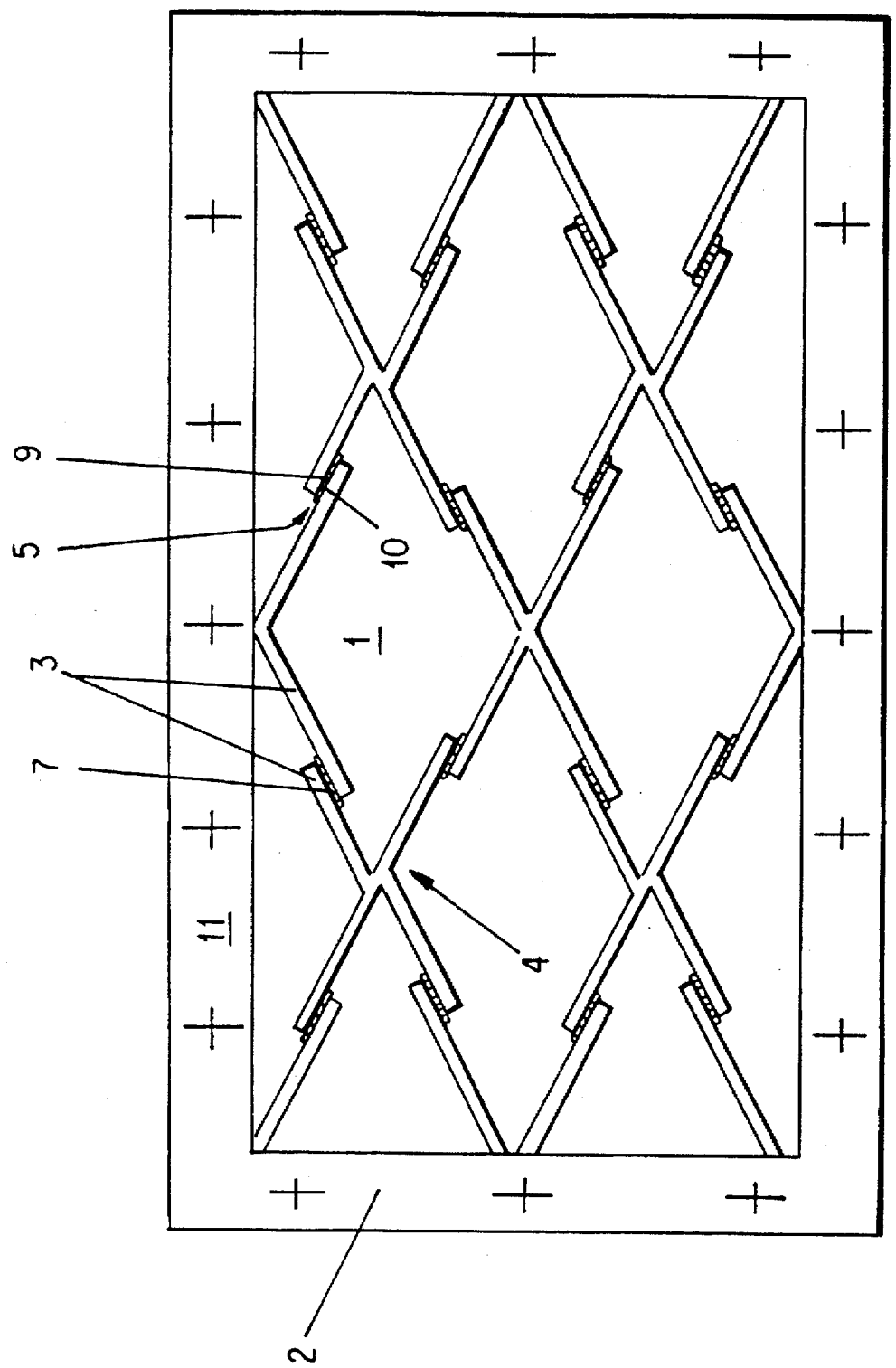
FIG. 3 shows a second embodiment of a cross bracing.

In the embodiment of FIG. 3, the stiffening ribs 3 of the cross bracing 4 overlap each other in the region of their end boundaries 9, 10, and are welded to each other on the surfaces facing each other. The weld seam 7 consists of a material which corresponds to the material of the cover.

Figure 4:
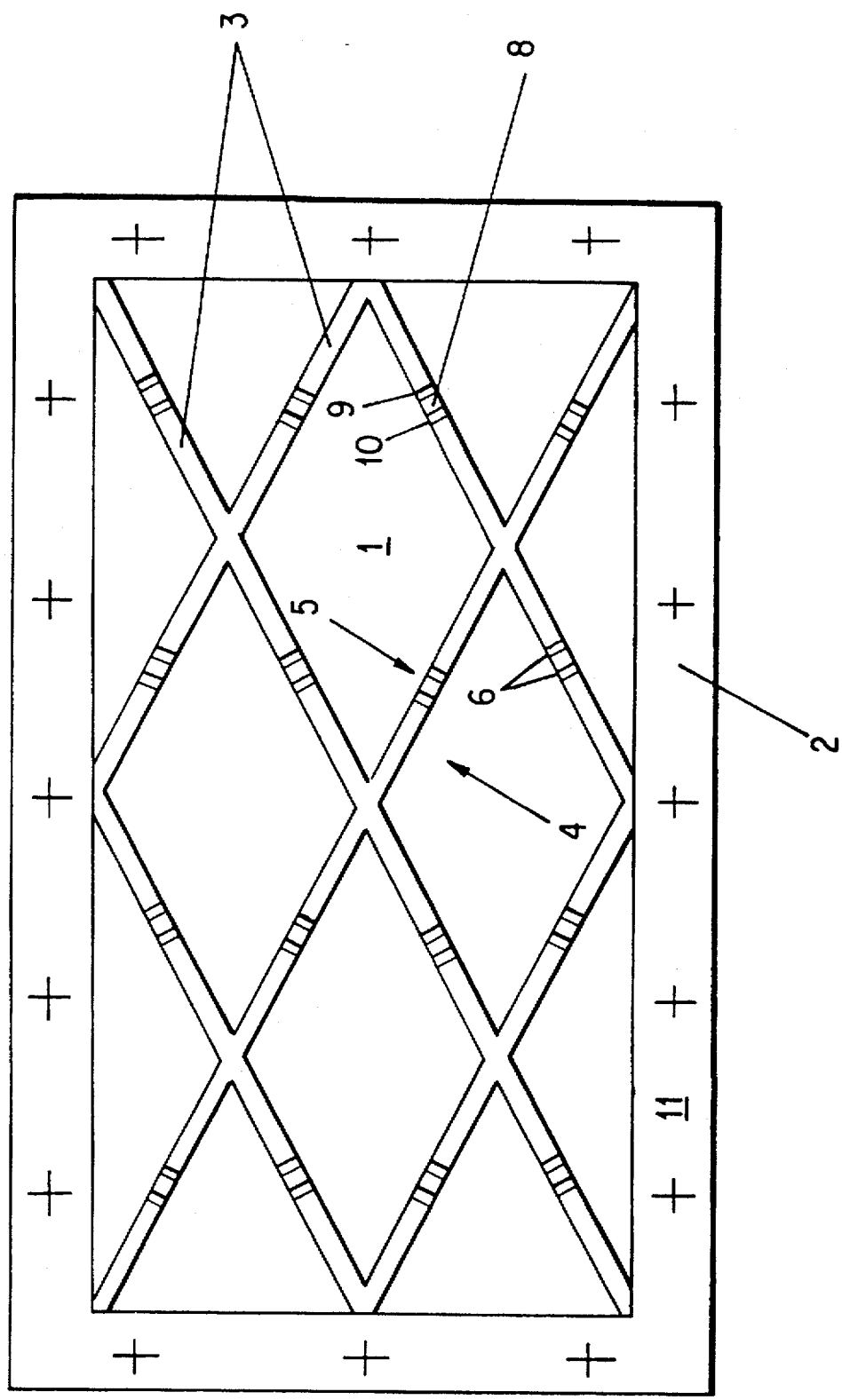
FIG. 4 shows a third embodiment, similar to the embodiment of FIG. 2, in which the stiffening ribs having a boundary which differs from FIG. 2.

In FIG. 4 connector bodies 8, which are attached by adhesive 6 to the boundaries 9, 10 of the stiffening ribs 3, are inserted in the clearances 5 between the stiffening ribs 3, which also form a cross bracing 4.

After the setting and hardening of the adhesive 6 shown in FIGS. 2 and 4 and the cooling of the weld seam 7 of FIG. 3, the polymeric material has as high a torsional rigidity as if the stiffening ribs were developed so as to pass into each other as a single piece formed during the first manufacturing step. This structural rigidity is attained even though in the initial injection molding step, the cover is produced with an interrupted cross bracing by injection molding, after which the cover is clamped with its sealing surface 11 onto a flange surface corresponding to the structural part to be covered. Once it has been placed in the clamped condition, the stiffening ribs 3 of the cross bracing, which are contiguous to the clearances 5, are connected to each other in a subsequent manufacturing step. The fastening flange 2 of the cover (which, in the embodiment shown, comprises the sealing surface 11), has a flat sealing surface 11 which extends parallel to the flange surface of the structural part to be covered.

What is claimed is:

1. A method of manufacturing a polymeric cover having a fastening flange, a plurality of sidewalls, and a bottom, comprising the steps of:

injection molding a cover so as to include a lattice of stiffening ribs connecting adjacent and opposed sidewalls and the bottom of the cover in a first step wherein the lattice of stiffening ribs has a plurality of interrupted portions;

removing the cover from the mold;

clamping the cover by its fastening flange onto a flange surface which corresponds to a structural part to be covered; and connecting together the interrupted portions of the stiffening ribs of the lattice, thereby providing a rigid cross-bracing to the cover.

2. A method according to claim 1, wherein the stiffening ribs are connected to each other by adhesion.

3. A method according to claim 1, wherein the stiffening ribs are welded to each other thermally or by ultrasonics.

4. A method according to claim 2, wherein the stiffening ribs are welded to each other thermally or by ultrasonics.

5. A method according to claim 1, wherein the stiffening ribs are connected to each other by an injection-molding process in the final manufacturing step.

6. A method according to claim 2, wherein the stiffening ribs are connected to each other by an injection-molding process in the final manufacturing step.

* * * * *